US012803825B2

(12) United States Patent
Shamis et al.

(10) Patent No.: US 12,803,825 B2
(45) Date of Patent: Nov. 17, 2026

(54) RECEIPTS OF A DISTRIBUTED LEDGER

(71) Applicant: Microsoft Technology Licensing, LLC, Redmond, WA (US)

(72) Inventors: Alexander Shamis, Cambridge (GB); Amaury Pierre Paul Chamayou, Cambridge (GB); Edward Ashton, Cambridge (GB); Julien Maffre, Cambridge (GB); Sylvan Clebsch, Cambridge (GB); Cedric Alain Marie Christophe Fournet, Cambridge (GB); Miguel Oom Temudo de Castro, Cambridge (GB); Antoine Jean Delignat-Lavaud, Cambridge (GB); Peter Robert Pietzuch, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 287 days.

(21) Appl. No.: 18/260,763

(22) PCT Filed: Jan. 25, 2022

(86) PCT No.: PCT/US2022/013585
§ 371 (c)(1),
(2) Date: Jul. 7, 2023

(87) PCT Pub. No.: WO2022/169628
PCT Pub. Date: Aug. 11, 2022

(65) Prior Publication Data
US 2024/0064033 A1 Feb. 22, 2024

(30) Foreign Application Priority Data
Feb. 2, 2021 (EP) .................................... 21154660

(51) Int. Cl.
*H04L 9/00* (2022.01)
*H04L 9/32* (2006.01)

(52) U.S. Cl.
CPC .............. *H04L 9/50* (2022.05); *H04L 9/3247* (2013.01)

(58) Field of Classification Search
CPC .................... G06Q 20/00–425; H04L 9/00–50
See application file for complete search history.

(56) References Cited

U.S. PATENT DOCUMENTS 9,960,920 B2 5/2018 Cuende et al.
10,764,062 B2 9/2020 Yang
(Continued)

OTHER PUBLICATIONS

Rambaja, et al. "Compact Merkle Multiproofs" arXiv, Feb. 24, 2020, available at: https://arxiv.org/pdf/2002.07648 (Year: 2020).*
(Continued)

*Primary Examiner* — Mohammad A. Nilforoush
(74) *Attorney, Agent, or Firm* — Workman Nydegger

(57) ABSTRACT

Systems and methods are provided for generating a combined receipt in a distributed ledger system implemented by replicas of a network. The replicas maintain a distributed ledger comprising a plurality of executed transactions authenticated using a hash tree having a hash root. Some or all of the replicas cryptographically sign the hash root. A combined receipt for a first transaction and second transaction of a plurality of executed transactions is generated by determining path information comprising a minimum set of values required to generate the hash root from either the first transaction or the second transaction given the first transaction and the second transaction. The combined receipt for the first and second transactions comprises: i) the determined path information; and ii) signatures of one or more of the replicas which signed the hash root.

20 Claims, 2 Drawing Sheets

(56) References Cited

U.S. PATENT DOCUMENTS

| | | | |
|---|---|---|---|
| 11,671,262 | B2 | 6/2023 | Antonopoulos et al. |
| 2019/0305957 | A1 | 10/2019 | Reddy et al. |
| 2020/0252221 | A1 | 8/2020 | Zamani et al. |
| 2020/0349123 | A1 | 11/2020 | Irazabal |
| 2021/0014042 | A1 | 1/2021 | Sivathanu et al. |

OTHER PUBLICATIONS

"Distributed Ledgers", Retrieved From: https://css.csail.mit.edu/6.858/2019/lec/121-bitcoin.txt, Retrieved Date: Nov. 22, 2020, 4 Pages.
"Search Report Issued in European Patent Application No. 21154660.1", Mailed Date: Jul. 16, 2021, 10 Pages.
Hentschel, et al., "Flow: Separating Consensus and Compute", In Repository of arXiv:1909.05821v1, Sep. 12, 2019, 21 Pages.
Howard, et al., "The Confidential Consortium Framework", Retrieved From: https://github.com/microsoft/ccf, Retrieved Date: Nov. 22, 2020, 2 Pages.
"International Search Report and Written Opinion Issued in PCT Application No. PCT/US22/013585", Mailed Date: Apr. 25, 2022, 20 Pages.
Mcdonald, Jim, "Understanding Merkle Pollards", Retrieved From: https://medium.com/@jgm.orinoco/understanding-merkle-pollards-1547fc7efaa, Feb. 11, 2019, 7 Pages.
Mcdonald, Jim, "Understanding Sparse Merkle Multiproofs", Retrieved From: https://medium.com/@jgm.orinoco/understanding-sparse-merkle-multiproofs-9b9f049e8f08, Mar. 1, 2019, 6 Pages.
Vaughan, et al., "Chainpoint—A Scalable Protocol for Recording Data in the Blockchain and Generating Blockchain Receipts", Retrieved From: https://assets.ctfassets.net/sdlntm3tthp6/resource-asset-r418 c17507d5445321b6f60efa607a0ab66d/22154ffd-c5a8-48e0-8d23-ad9e5641f0ac.pdf, Jul. 22, 2015, 6 Pages.
Communication under Rule 71(3) EPC received in EP Application No. 22703235.6, mailed on Oct. 21, 2025, 8 Pages.
Communication under Rule 71(3) received for European Application No. 21154660.1, mailed on Nov. 12, 2025, 07 Pages.
Decision to grant a European patent pursuant to Article 97(1) EPC received for European Application No. 21154660.1, mailed on Mar. 19, 2026, 02 Pages.
Decision to grant a European patent pursuant to Article 97(1) EPC received in EP Application No. 22703235.6, mailed on Feb. 12, 2026, 2 Pages.

* cited by examiner

RECEIPTS OF A DISTRIBUTED LEDGER

TECHNICAL FIELD

The present disclosure relates to systems and methods for generating receipts in a distributed ledger system.

BACKGROUND

A distributed ledger system comprises a plurality of replica devices (also called "nodes"), each implementing a consensus-based and synchronized distributed ledger. Each replica maintains a copy of the ledger and updates itself independently, without the use of a central authority. A blockchain is one example of a distributed ledger.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

According to a first aspect disclosed herein, there are provided systems and methods for generating a combined receipt in a distributed ledger system implemented by replicas of a network. The replicas maintain a distributed ledger comprising a plurality of executed transactions authenticated using a hash tree having a hash root. Some or all of the replicas cryptographically sign the hash root. A combined receipt for a first transaction and second transaction of a plurality of executed transactions is generated by determining path information comprising a minimum set of values required to generate the hash root from either the first transaction or the second transaction given the first transaction and the second transaction. The combined receipt for the first and second transactions comprises: i) the determined path information; and ii) an indication of which replicas signed the hash root.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

A receipt is designed to notify a user that an action has occurred. In a "Byzantine" system, a receipt also provides proof of the actions occurrence.

The present disclose relates to a distributed ledger system. Receipts in this context are data items which can be stored and transmitted over a network. Such receipts are typically implemented utilizing cryptographically transferable evidence, e.g. signing with an asymmetric encryption key.

The receipts of transactions can be very important to users. However, memory is required to store each receipt, which can be problematic for example for users wishing to store many receipts. In addition, transmitting a large number of receipts also comes with its own requirements in terms of network bandwidth.

The present disclosure provides a new type of "combined" receipt which is condensed form of receipt relating to a plurality of transactions, while still providing the same level of proof in relation to each of the transactions. Hence, this comes with advantages in relation to both memory and network bandwidth requirements.

As will be described in more detail herein, the distributed ledger comprises a plurality of transactions. The ledger is authenticated via a hash tree (also called a Merkle tree), having a hash root (Merkle root) which is periodically signed by replicas of the distributed ledger system. Replicas sign the root of the hash tree to commit to all the transactions on the ledger. Hence, providing that a particular transaction was added to the ledger by those replicas involves reconstructing the hash root based on that transaction. Not all of the hash tree node values are required to do this. Any set of hash tree node values which allows a given transaction to be connected to the hash root may be referred to as "path information" for that transaction.

In accordance with examples described herein, a combined receipt for a first transaction and second transaction may be generated. First, path information is determined which comprises a minimum set of values required to generate the hash root from either the first transaction or the second transaction given the first transaction and the second transaction. This path information may be referred to as "compressed" path information (or "reduced", "simplified", or "pruned" path information) in that redundant information has been removed. Next, the combined receipt is generated. The combined receipt comprises i) the determined compressed path information; and ii) an indication of which replicas signed the hash root.

Figure 1:
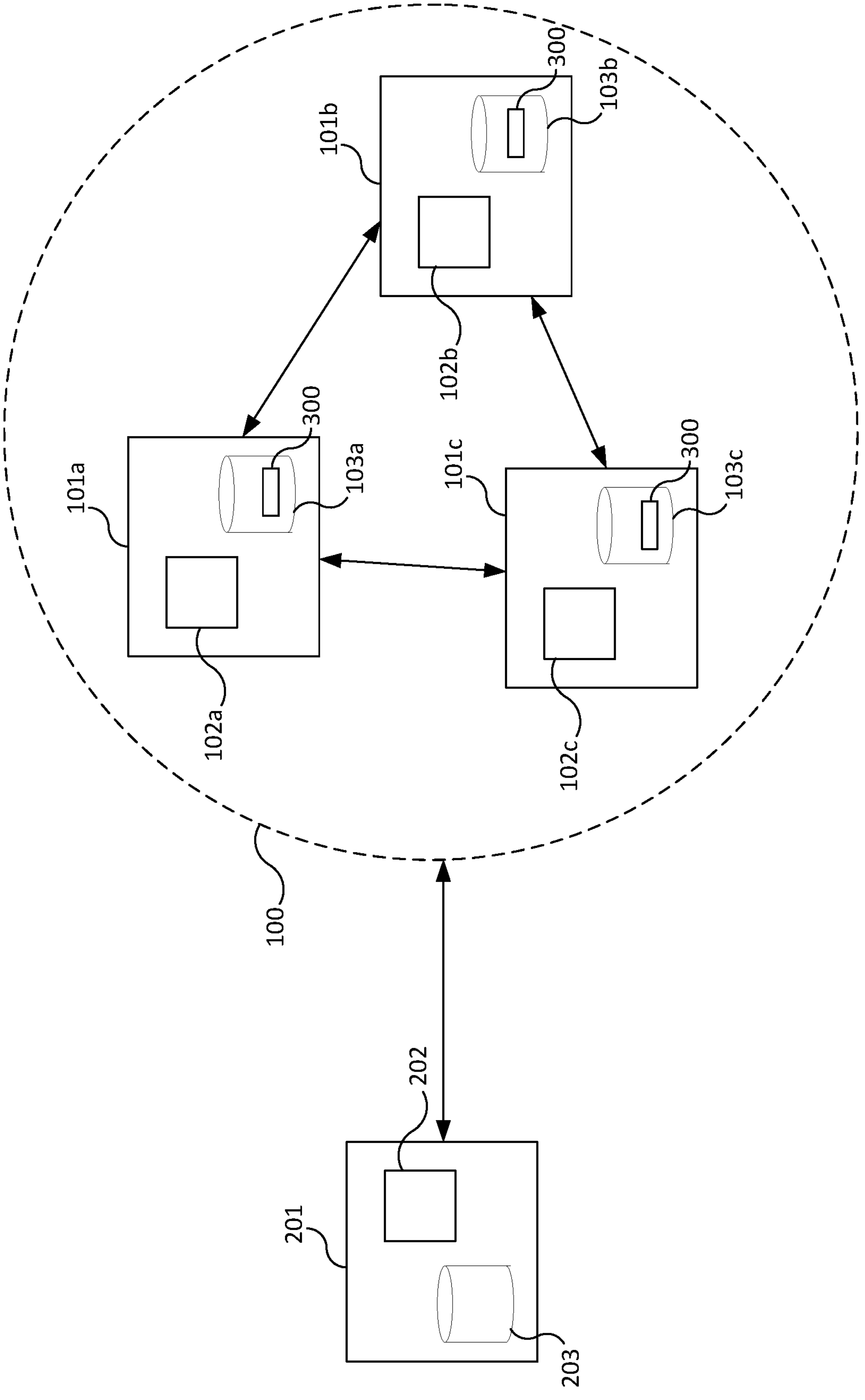
FIG. 1 shows schematically an example system for implementing a distributed ledger.

FIG. 1 shows schematically an example system for implementing a distributed ledger 300. An example of the ledger 300 itself is described in more detail later.

The system comprises a consortium 100 and a client device 201. The consortium 100 comprises a plurality of replicas 101 (also called "nodes"). Each replica 101 comprises a respective processor 102 and a memory 103. In the example of FIG. 1, three replicas 101*a-c* are shown, but it is appreciated that any number of replicas 101 may be part of the consortium 100. The replicas 101 within the consortium 100 are operatively coupled to one another. Replicas 101 may be removed from the consortium 100, and new replicas 101 may be added to the consortium 100 over time, as discussed in more detail later below.

The client device 201 is operatively coupled to the consortium 100 (i.e. to at least one of the replicas 101). The client device 201 comprises a processor 202 and a memory 203. In some examples, a single computing device may act as both a replica 101 and a client 201.

In operation, the replicas 101 of the consortium 100 implement a distributed ledger system. Distributed ledger systems are known in the art and therefore it is appreciated that the distributed ledger system will be only be described insofar as is relevant for the purposes of the present disclosure.

An important aspect of the distributed ledger system implemented by the replicas 101 is the maintenance of a (distributed) ledger 300. The ledger 300 is a distributed data structure, a copy of which is maintained by each replica 101 in its local memory 103. An example of a ledger 300 is a "blockchain".

A client, using the client device 201 can submit transactions to the consortium 100 (e.g. by transmitting a transaction request to one of the replicas 101). A transaction, for example, may be to convey a digital asset (e.g. a quantity of digital tokens). In an example, the transactions 301 may relate to a key-value store. The key-value store comprises a set of keys (e.g. names) and associated values (e.g. account balance for each name). In such cases, a transaction 301 represents an operation to perform on the key-value store. Each replica 101 may store a copy of the key-value store in local memory 102.

The ledger 300 comprises a plurality of transactions 301 (described in more detail below in relation to FIG. 2) which have been "committed" (i.e. enacted). The replicas 101 each implement the same application including a protocol for maintaining consistency across the copies of the ledger 300. Such protocols are known in the art which allow the replicas 101 to agree on, and execute, transactions in a synchronized manner so that the copies of the ledger 300 at each replica 101 agree. In an example, a "primary" one of the replicas 101 creates a "batch" of such transactions and provides an indication of the proposed batch to the other replicas 101. If sufficiently many replicas 101 agree, the batch of transactions is "committed" and now form part of the ledger 300. Hence, the state of the ledger 300 itself changes every time new transactions 301 are added.

The ledger 300 is authenticated using a Merkle tree 310 (also known as a "hash tree"). In general, the terms "Merkle tree" and "hash tree" may be used interchangeably. The Merkle tree 310 binds the transactions 301 in the ledger 300 together. The replicas 101 periodically sign the root of the Merkle tree 310 (known as the Merkle root 311). In particular, a given replica 101 will only sign the Merkle root 311 when it "commits" to the transactions represented in that Merkle tree 310.

Figure 2:
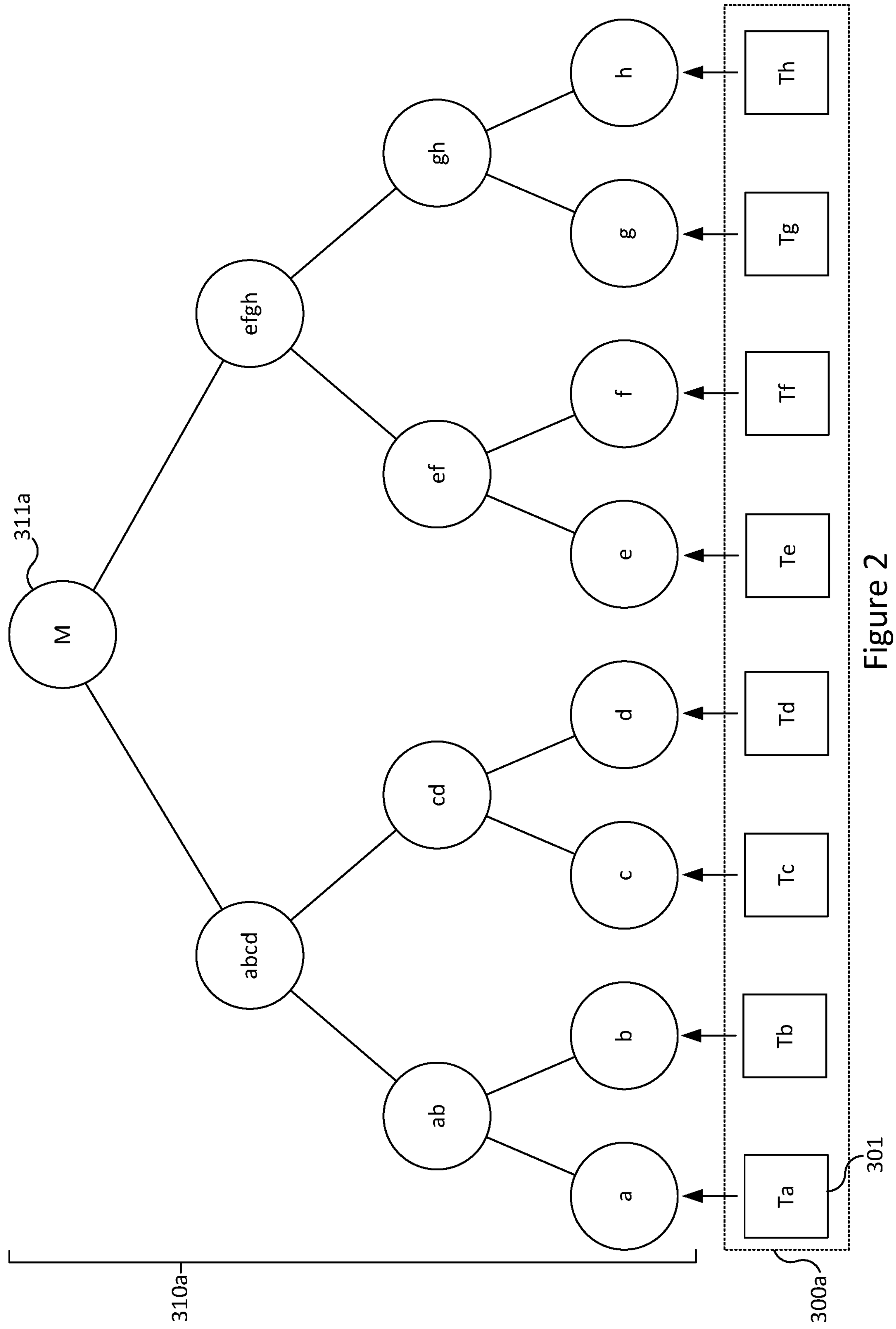
FIG. 2 shows schematically an example ledger at one point in time.

FIG. 2 shows schematically an example ledger 300*a* at one point in time where the ledger 300*a* comprises eight transactions 301. The transactions 301 are labelled Ta-Th. It is appreciated that the ledger 300 itself typically contains orders of magnitude more transactions 301 than shown in FIG. 2.

In the example of FIG. 2, a binary Merkle tree is used to authenticate the ledger 300*a*. However other types of Merkle tree are also possible, and the terms "Merkle tree" and "hash tree" do not necessarily imply a binary tree.

In this example, a hash of each transaction 301 forms a leaf node of the Merkle tree 310*a*. The hashes (a-h) are shown as circles and the transactions (Ta-Th) are shown as squares. Each adjacent pair of hashes (leaves) is combined into a new hash value, at a new node in the Merkle tree 310*a* one layer higher than the pair from which it was generated. This process is repeated until a single value, the Merkle root 311*a* is obtained. It is appreciated that the hashes may be implemented using any cryptographically secure hash algorithm known in the art (e.g. SHA256). In the figures, lowercase letters (a, b, c, . . . ) are used to denote the hash of the respective transaction (Ta, Tb, Tc, . . . ). Concatenated lowercase letters (ab, cd, ef, . . . ) are used to denote a hash formed of a combination of the hashes indicated by its component letters. For example, "ab" is used to denote a hash formed as a combination of "a" (the hash of transaction Ta) and "b" (the hash of transaction Tb). "M" is used to denote the Merkle root.

In accordance with examples described herein, when the client 201 requests a receipt for a transaction 301, the client 201 receives a receipt comprising both: i) path information relating to the path in the Merkle tree 310 from the leaf representing that transaction 301 to the Merkle root 311; and ii) an indication of which replicas 101 signed that Merkle root 311.

The path information relating to a particular transaction 301 includes a set of values allowing the Merkle root 311 to be re-constructed from that transaction 301. If this re-constructed Merkle root 311 matches the Merkle root 311 which was signed, then the client 201 can verify that the replicas 101 whose signatures are present in the receipt did in fact commit to that particular transaction 301.

Table 1 shows the information which would be included in the receipt for each transaction 301 in FIG. 2.

TABLE 1

| | Receipt | |
|---|---|---|
| Transaction | Signatures | Path Info |
| Ta | IDs of replicas which signed M | b, cd, efgh |
| Tb | IDs of replicas which signed M | a, cd, efgh |
| Tc | IDs of replicas which signed M | ab, d, efgh |
| Td | IDs of replicas which signed M | ab, c, efgh |
| Te | IDs of replicas which signed M | abcd, f, gh |
| Tf | IDs of replicas which signed M | abcd, e, gh |
| Tg | IDs of replicas which signed M | abcd, ef, h |
| Th | IDs of replicas which signed M | abce, ef, g |

The receipt for a given transaction 301 includes information (path information) required to calculate the Merkle root 311 from that transaction. The Merkle root 311 signed by the replicas 101 can either be obtained from the signature (by decryption), or it may be included in the receipt itself. In either case, if the calculated Merkle root 311 matches the signed Merkle root 311, then it is verified that that replica 101 committed to the transaction 301 referred to in the receipt.

The present disclosure recognizes that some information relating to a first transaction 301*a* or receipt thereof can be used to support the calculation of the Merkle root 311 for a second transaction 301*b*. Hence, the overall set of values required (combined path information) can be reduced. This reduced path information may be referred to as "compressed" path information. Moreover, only a single set of signatures is required as each transaction 301 is verified by the same Merkle root 311.

In accordance with examples described herein, "combined" receipts can be used. A combined receipt pertains to two or more transactions, while still providing the same level of proof in relation to each of the transactions as would be provided by individual receipts for each of the two or more transactions. Advantages include:

1. If a user needs to retain multiple receipts, there is a reduction in the amount of durable storage required to store the same amount of data.
2. There is no need to store more than one set of signatures as the signature for the most recent receipt is enough to provide the same security properties as having the combination of all other receipt's signatures.
3. The act of successfully combining receipts proves that they all are part of the same Merkle tree. If this Merkle tree is a projection of a ledger, this then demonstrates that they come from the same ledger.

Examples of combining receipts (using the transactions 301 from FIG. 2) will now be described. Stated generally, generating a combined receipt for a first transaction 301*a* and a second transaction 301*b* comprises: determining compressed path information consisting of a minimum set of values required to generate the Markle root 311 from either the first transaction 301*a* or the second transaction 301*b* given the first transaction 301*a* and the second transaction 301*b*; and generating a combined receipt for the first and second transactions 301*a*, 301*b*, the combined receipt comprising: i) the determined compressed path information; and ii) an indication of which replicas 101 signed the hash root 311.

The size of the compressed path information (i.e. the number of nodes (set of values) needed) is determined by the height of the Merkle tree (or the number of nodes in the Merkle tree). If the number of nodes is n then the number of nodes need is round_up(log(n)), this will be equal to the height. When combining the maximum number of nodes in a combined receipts can be defined to be (m=number of receipts) m*(log(n)−1) and the min would be (m−1)+(log (n)−1). The minimum path from the Tx to the root will be log(n) but the evidence hashes are log(n)−1. This is because there is no "sibling" hash for the Merkle root.

This process may be performed by the client 201, or by any one of the replicas 101. Additionally, this process may be performed automatically in response to the client 201 requesting two or more receipts, or may be performed upon request by the client 201. Further still, a combined receipt for two (or more) transactions 301 may be generated without first generating separate receipts for the individual transactions, or a combined receipt for two (or more) transactions 301 may be generated "after the fact" from two (or more) receipts which were generated previously.

Example 1

As a first example, consider that the client 201 wishes to retain receipts for both transaction Te and transaction Tf. As shown in Table 1, the individual receipts contain the following information:

Receipt-Te:
M signatures
abcd, f, gh
Receipt-Tf:
M signatures
abcd, e, gh

Hence, the client 201 would need to store six hash values (abcd, f, gh, abcd, e, gh) and two copies of the signatures of the Merkle root 311. Instead, consider a combined receipt of the following form:

Combined Receipt Te-Tf:
M signatures
abcd, gh

That is, the combined receipt only includes two hash values (abcd and gh) and one copy of the signatures of the Merkle root 311. This saves four hash values and one copy of the signatures on M relative to the individual receipts. The combined receipt still comprises enough information for the individual transactions Te and Tf to be verified.

Example 2

As a second example, consider that the client 201 wishes to retain receipts for both transaction Tb and transaction Tg. As shown in Table 1, the individual receipts contain the following information:

Receipt-Tb:
M signatures
a, cd, efgh
Receipt-Tg:
M signatures
abcd, ef, h

Hence, the client 201 would need to store six hash values (a, cd, efgh, abcd, ef, h) and two copies of the signatures of the Merkle root 311. Instead, consider a combined receipt of the following form:

Combined Receipt Tb-Tg:
M signatures
a, cd, ef, h

That is, the combined receipt includes four hash values (a, cd, ef, h) and one copy of the signatures of the Merkle root 311. Even though the combined receipt itself has more hash values than any one of the individual receipts, only a single receipt (the combined receipt) is required to be able to verify both transactions Tb and Tg. This saves four hash values and one copy of the signatures on M relative to the individual receipts.

Example 3

As a third example, consider that the client 201 wishes to retain receipts for three transactions: Ta, Tb, Tg. As shown in Table 1, the individual receipts contain the following information:

Receipt-Ta
M signatures
b, cd, efgh
Receipt-Tb:
M signatures
a, cd, efgh
Receipt-Tg:
M signatures
abcd, ef, h Hence, the client 201 would need to store nine hash values (b, cd, efgh, a, cd, efgh, abcd, ef, h) and three copies of the signatures of the Merkle root 311. Instead, consider a combined receipt of the following form:

Combined Receipt Ta-Tb-Tg:
M signatures
cd, ef, h

That is, the combined receipt includes three hash values (cd, ef, h) and one copy of the signatures of the Merkle root 311. Relative to the individual receipts, the combined receipt saves six hash values and two copies of the signatures on M.

Example Implementation

In some cases, a combined receipt for two or more transactions 301 can be generated based on the information present in the individual receipts for those transactions 301. In such cases, it is possible to generate a combined receipt "after the fact" (i.e. given two or more existing receipts). In other cases, the combined receipt may require some information which is not derivable from either receipt. In such cases, the required information must be obtained from one of the replicas 101.

In embodiments, receipts may be generated in batches. So if two receipts are from the same batch, they will not need any extra data. Instead of generating a receipt at any random point, a batch of transactions may be executed, the Merkle root signed, and then a series of receipts generated. However, the use of batches is as an optional optimization, and is not limiting.

As mentioned above, the generation of a combined receipt for two or more transactions 301 can be performed by either one of the replicas 101 or the client 201.

Replica Combines

In some examples, a replica 101 may provide the client 201 with receipts automatically when transactions requested by that client 201 are committed to the ledger 300. If the client 201 has requested multiple transactions, then the replica 101 may automatically provide a combined receipt for those transactions.

In other examples, receipts may be provided to the client 201 upon request by the client 201. There are various possibilities in this regard, examples of which are given below.

In a first example, the client 201 may send a single request to a replica 101 for a single combined receipt over multiple transactions 301. The replica 101 then generates the combined receipt for those transactions 301 and provides the combined receipt to the client 201.

In a second example, the client 201 may send a single request to a replica 101 for multiple receipts, each receipt pertaining to a different transaction 301. The replica 101 may be configured to automatically generate a combined receipt for those transactions 301 and provide the combined receipt to the client 201.

In a third example, the client may send multiple requests for receipts to a replica 101, each request pertaining to a single transaction 301. The replica 101 may be configured to generate and provide the client 201 with a single combined receipt for these transactions 301 if the requests are received within a configurable period of time (e.g. a second, a minute, etc.)

Client Combines

Alternatively to the above, the client 201 may perform the combining of receipts. That is, the client 201, having two or more receipts stored in local memory 202, may determine to combine two or more of these stored receipts. In some examples, the client 201 may automatically combine two or more receipts in response to receiving the second receipt from a replica 101. In some examples, the client 201 may combine two or more receipts in response to determining that an available space in memory 202 is below a configurable threshold. In some examples, the client 201 may combine two or more receipts in response to receiving input from a user indicating that receipts should be combined.

As mentioned above, it may be possible for the client 201 to combine two or more receipts in memory 202 without requiring additional information. In some examples, however, the client 201 may need to request additional information from one of the replicas 101.

Example: client has receipts Ta and e.g. Tk—more information is required in order to combine them (see below)

client requests (only) the additional information replica provides the additional information client combines into single receipt Ta: b, cd, efgh Tk: Mi, j, lmno Combined: b, cd, efgh, i, j, lmno Governance The following describes one example of how replicas may be determined to be part of the network that maintains the distributed ledger. However this is not limiting. There are many known ways of determining whether replicas are part of the ledger network. Below is one example, but in other examples they can be provided by a trusted authority, or an endorsement scheme using group signing.

Nodes may be run and maintained by Operators. However, in certain applications nodes should preferably be trusted by the consortium of members before participating in a CCF network.

Consortium members are the owners of the service. Members are identified by their signing keys, and they may be added or removed over the lifetime of the service. Members issue governance transactions signed by their keys to change the set of consortium members, add or remove replicas, or update the service implementation.

A CCF network is governed by a consortium of Members. The scriptable Constitution, recorded in the ledger itself, defines a set of rules that members must follow.

Members can submit proposals to modify the state of the Key-Value Store. For example, members can vote to allow a new trusted user to issue requests to the application or to add a new member to the consortium.

Proposals are executed only when the conditions defined in the constitution are met (e.g. a majority of members have voted favourably for that proposal).

The governance of a distributed private ledger is critical to the correct and honest functioning of said system. Through governance we known which nodes are part of the distributed system and which are not. In addition, it defines other properties and giving actors difference permissions, specifying which code replicas may run, etc. A receipt must be tied to governance as said governance shows which replicas may sign a receipt to ensure its validity. Each governance operation produces a receipt. We can maintain a combined receipt of all governance operations. This allows us to do the following:

1. A Client can request a collection of all the governance transaction receipts and combine this with any other receipts.
2. Each client receipt will have a pointer to the last governance transaction, and this shows the client that they have a correct and up-to-date collection of governance transaction receipts.
3. Combining an up to date collection of governance receipts along with other receipts provides evidence to the client which nodes may sign a receipt.

It will be understood that the processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory (e.g. a solid-state drive or SSD).

Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc.

The examples described herein are to be understood as illustrative examples of embodiments of the invention.

More generally, according to one aspect disclosed herein there is provided a method of generating a combined receipt for a first transaction and second transaction of a plurality of executed transactions in a distributed ledger maintained by a network of replicas configured to implement a distributed ledger system; the plurality of executed transactions in the distributed ledger being authenticated using a hash tree having a hash root cryptographically signed by some of all of the replicas, and a plurality of leaves each representing a respective one or more of the plurality of transactions including the first and second transactions being of different leaves; the method comprising:

determining compressed path information consisting of a minimum set of hash values from the hash tree required to generate the hash root from either the first transaction or the second transaction given the first transaction and the second transaction, the hash values being nodes of the hash tree; and generating a combined receipt for the first and second transactions, the combined receipt comprising:

i) the compressed path information; and ii) an indication of which replicas signed the hash root.

In embodiments, the method may be performed by one of said replicas.

In embodiments, the method comprises receiving a request from a client a request for the combined receipt, and wherein the replica performs said determining and generating in response to receiving said request.

In embodiments, the method comprises receiving a first request from a client for a first receipt pertaining to the first transaction and a second request from the client for a second receipt pertaining to the second transaction, and wherein the replica performs said determining and generating in response to receiving the second request.

In embodiments, the replica performs said determining and generating in response to receiving the second request within a configurable period of time after the first request.

In embodiments, said two or more requests are received from the client device as part of a single message.

In embodiments, the method is performed by a client device configured to access the network of replicas.

In embodiments, the method comprises obtaining a first receipt for a first transaction of said transactions and a second receipt for a second transaction of said transactions; and wherein said determining is performed based on the first receipt and second receipt.

In embodiments, obtaining at least one of the first receipt and second receipt comprises accessing the first receipt or second receipt from a memory of the client.

In embodiments, obtaining at least one of the first receipt and second receipt comprises request the first receipt or second receipt from one of said replicas and receiving the first receipt or second receipt from said one of said replicas.

In embodiments, the client performs said determining and generating in response to obtaining the second receipt.

In embodiments, the client performs said determining and generating in response to an available space in a memory of the client being below a configurable threshold.

In embodiments, the client performs said determining and generating in response to receiving user input indicating that receipts should be combined.

In embodiments, the method comprises obtaining a first receipt for a first transaction of said transactions and a second receipt for a second transaction of said transactions; and wherein the method comprises:

determining a portion of the compressed path information not available in the first or second receipt; and obtaining said portion of the compressed path information.

According to one aspect disclosed herein there is provided a replica in a network of replicas, each storing a copy of a distributed ledger comprising a plurality of executed transactions authenticated using a hash tree having a hash root cryptographically signed by some or all of the replicas and a plurality of leaves each representing a respective one or more of the plurality of transactions, the replicas being configured to:

receive from a client a request for a receipt of a first transaction of said transactions and a request for a receipt of a second transaction of said transactions, the first and second transactions being of different leaves of the hash tree;

determine compressed path information comprising a minimum set of values required to generate the hash root from either the first transaction or the second transaction given the first transaction and the second transaction;

generate a combined receipt for the first and second transactions, the combined receipt comprising:

i) the determined compressed path information; and ii) an indication of which replicas signed the hash root; and provide the combined receipt to the client.

According to one aspect disclosed herein there is provided a client configured to access a network of replicas, each storing a copy of a distributed ledger comprising a plurality of executed transactions authenticated using a hash tree having a hash root cryptographically signed by some or all of the replicas and a plurality of leaves each representing a respective one or more of the plurality of transactions, the client being configured to:

request, from one of said replicas, a first receipt for a first transaction of said transactions and a second receipt for a second transaction of said transactions, the first and second transactions being of different leaves of the hash tree;

receive, from one of said replicas, the first receipt comprising first path information comprising a set of values required to generate the hash root from the first transaction, and the second receipt comprising second path information comprising a set of values required to generate the hash root from the second transaction;

determine compressed path information comprising a minimum set of values required to generate the hash root from either the first transaction or the second transaction given the first transaction and the second transaction; and generate a combined receipt for the first and second transactions, the combined receipt comprising:

i) the determined compressed path information; and ii) an indication of which replicas signed the hash root.

According to one aspect disclosed herein there is provided a method performed by a replica in a network of replicas, each storing a copy of a distributed ledger comprising a plurality of executed transactions authenticated using a hash tree having a hash root cryptographically signed by some or all of the replicas and a plurality of leaves each representing a respective one or more of the plurality of transactions, the method comprising:

receiving from a client a first request for a first receipt of a first transaction of said transactions;

receiving from the client a second request for a second receipt of a second transaction of said transactions, the first and second transactions being of different leaves of the hash tree;

determining compressed path information comprising a minimum set of values required to generate the hash root from either the first transaction or the second transaction given the first transaction and the second transaction;

generating a combined receipt for the first and second transactions, the combined receipt comprising:

i) the determined compressed path information; and ii) an indication of which replicas signed the hash root; and providing the combined receipt to the client.

According to one aspect disclosed herein there is provided a method performed by a client device configured to access a network of replicas, each storing a copy of a distributed ledger comprising a plurality of executed transactions authenticated using a hash tree having a hash root cryptographically signed by some or all of the replicas and a plurality of leaves each representing a respective one or more of the plurality of transactions:

requesting a first receipt for a first transaction of said transactions;

requesting a second receipt for a second transaction of said transactions, the first and second transactions being of different leaves of the hash tree;

receiving the first receipt comprising first path information comprising a set of values required to generate the hash root from the first transaction;

receiving the second receipt comprising second path information comprising a set of values required to generate the hash root from the second transaction;

determining compressed path information comprising a minimum set of values required to generate the hash root from either the first transaction or the second transaction given the first transaction and the second transaction; and generating a combined receipt for the first and second transactions, the combined receipt comprising:

i) the determined compressed path information; and ii) an indication of which replicas signed the hash root.

According to one aspect disclosed herein there is provided a computer program product for generating a combined receipt for a first transaction and second transaction of a plurality of executed transactions in a distributed ledger maintained by a network of replicas configured to implement a distributed ledger system; the plurality of executed transactions in the distributed ledger being authenticated using a hash tree having a hash root cryptographically signed by some of all of the replicas, and a plurality of leaves each representing a respective one or more of the plurality of transactions including the first and second transactions being of different leaves; the computer program product comprising instructions configured so as when executed by one or more processing units to perform a method comprising:

determining compressed path information consisting of a minimum set of hash values from the hash tree required to generate the hash root from either the first transaction or the second transaction given the first transaction and the second transaction, the hash values being nodes of the hash tree; and generating a combined receipt for the first and second transactions, the combined receipt comprising:

i) the compressed path information; and ii) an indication of which replicas signed the hash root.

According to one aspect disclosed herein there is provided a computer program product for use on a client device that is configured to access a network of replicas, each storing a copy of a distributed ledger comprising a plurality of executed transactions authenticated using a hash tree having a hash root cryptographically signed by some or all of the replicas and a plurality of leaves each representing a respective one or more of the plurality of transactions; the computer program comprising instructions embodied on a non-transitory computer readable medium and configured so as when run on one or more processors of the client device to perform operations of:

requesting a first receipt for a first transaction of said transactions;

requesting a second receipt for a second transaction of said transactions, the first and second transactions being of different leaves of the hash tree;

receiving the first receipt comprising first path information comprising a set of values required to generate the hash root from the first transaction;

receiving the second receipt comprising second path information comprising a set of values required to generate the hash root from the second transaction;

determining compressed path information comprising a minimum set of values required to generate the hash root from either the first transaction or the second transaction given the first transaction and the second transaction; and generating a combined receipt for the first and second transactions, the combined receipt comprising:

i) the compressed path information; and ii) an indication of which replicas signed the hash root.

According to another aspect disclosed herein, there is provided a method of generating a combined receipt for a first transaction and second transaction of a plurality of executed transactions in a distributed ledger maintained by a network of replicas configured to implement a distributed ledger system; the plurality of executed transactions in the distributed ledger being authenticated using a hash tree having a hash root cryptographically signed by some of all of the replicas, and a plurality of leaves each representing a respective one or more of the plurality of transactions including the first and second transactions being of different leaves; the method comprising:

determining compressed path information consisting of a minimum set of hash values from the hash tree required to generate the hash root from either the first transaction or the second transaction given the first transaction and the second transaction, the hash values being nodes of the hash tree; and generating a combined receipt for the first and second transactions, the combined receipt comprising:

i) the compressed path information; and ii) signatures of one or more of the replicas which signed the hash root.

According to another aspect disclosed herein, there is provided a computer program product for generating a combined receipt for a first transaction and second transaction of a plurality of executed transactions in a distributed ledger maintained by a network of replicas configured to implement a distributed ledger system; the plurality of executed transactions in the distributed ledger being authenticated using a hash tree having a hash root cryptographically signed by some of all of the replicas, and a plurality of leaves each representing a respective one or more of the plurality of transactions including the first and second transactions being of different leaves; the computer program product comprising instructions configured so as when executed by one or more processing units to perform a method comprising:

determining compressed path information consisting of a minimum set of hash values from the hash tree required to generate the hash root from either the first transaction or the second transaction given the first transaction and the second transaction, the hash values being nodes of the hash tree; and generating a combined receipt for the first and second transactions, the combined receipt comprising:

i) the compressed path information; and ii) signatures of one or more of the replicas which signed the hash root.

In an example, the computer program product according is for use on a client device that is configured to access the network of replicas, and the method comprises:

requesting a first receipt for the first transaction of said transactions;

requesting a second receipt for the second transaction of said transactions;

receiving the first receipt comprising first path information comprising a set of values required to generate the hash root from the first transaction; and receiving the second receipt comprising second path information comprising a set of values required to generate the hash root from the second transaction.

According to another aspect disclosed herein, there is provided a replica in a network of replicas, each storing a copy of a distributed ledger comprising a plurality of executed transactions authenticated using a hash tree having a hash root cryptographically signed by some or all of the replicas and a plurality of leaves each representing a respective one or more of the plurality of transactions, the replicas being configured to:

receive from a client a request for a receipt of a first transaction of said transactions and a request for a receipt of a second transaction of said transactions, the first and second transactions being of different leaves of the hash tree;

determine compressed path information comprising a minimum set of values required to generate the hash root from either the first transaction or the second transaction given the first transaction and the second transaction;

generate a combined receipt for the first and second transactions, the combined receipt comprising:

i) the determined compressed path information; and ii) signatures of one or more of the replicas which signed the hash root; and provide the combined receipt to the client.

Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

The invention claimed is:

1. A method of generating a combined receipt for a first transaction and second transaction of a plurality of executed transactions in a distributed ledger maintained by a network of replicas configured to implement a distributed ledger system; the plurality of executed transactions in the distributed ledger being authenticated using a hash tree having a hash root cryptographically signed by some or all of the replicas, and a plurality of leaves each representing a respective one or more of the plurality of executed transactions including the first and second transactions being of different leaves, the method comprising:

receiving at a first time, by a replica of the network of replicas, a first request from a client for a first receipt pertaining to the first transaction;

receiving, at a second time after the first time, a second request from the client for a second receipt pertaining to the second transaction;

determining, by the replica, that the second time is within a configurable period of time after the first time;

in response to the determining that the second time is within the configurable period of time:

determining, by the replica, compressed path information consisting of a minimum set of hash values from the hash tree required to generate the hash root from either the first transaction or the second transaction given the first transaction and the second transaction, the hash values being nodes of the hash tree; and generating, by the replica, a combined receipt for the first and second transactions, the combined receipt comprising:

i) the compressed path information; and ii) signatures of one or more of the replicas which signed the hash root.

2. A method according to claim 1, wherein the first request and the second request are received from the client device as part of a single message.

3. A method according to claim 1, further comprising obtaining, by the replica, a first receipt for the first transaction and a second receipt for the second transaction; and wherein said determining of the compressed path information is performed based on the first receipt and second receipt.

4. A method according to claim 3, wherein the obtaining of at least one of the first receipt and second receipt comprises requesting the first receipt or second receipt from one of said replicas and receiving the first receipt or second receipt from said one of said replicas.

5. A non-transitory machine-readable medium for generating a combined receipt for a first transaction and second transaction of a plurality of executed transactions in a distributed ledger maintained by a network of replicas configured to implement a distributed ledger system; the plurality of executed transactions in the distributed ledger being authenticated using a hash tree having a hash root cryptographically signed by some or all of the replicas, and a plurality of leaves each representing a respective one or more of the plurality of executed transactions including the first and second transactions being of different leaves; the non-transitory machine-readable medium comprising instructions configured so that when executed by a processor, perform operations comprising:

receiving at a first time, by a replica of the network of replicas, a first request from a client for a first receipt pertaining to the first transaction;

receiving, at a second time after the first time, a second request from the client for a second receipt pertaining to the second transaction;

determining, by the replica, that the second time is within a configurable period of time after the first time;

in response to the determining that the second time is within the configurable period of time:

determining, by the replica, compressed path information consisting of a minimum set of hash values from the hash tree required to generate the hash root from either the first transaction or the second transaction given the first transaction and the second transaction, the hash values being nodes of the hash tree; and generating, by the replica, a combined receipt for the first and second transactions, the combined receipt comprising:

the compressed path information; and signatures of one or more of the replicas which signed the hash root.

6. A replica comprising a processor and a memory in a network of replicas, each storing a copy of a distributed ledger comprising a plurality of executed transactions authenticated using a hash tree having:

a hash root cryptographically signed by the at least two replicas of the network of replicas, and a plurality of leaves each representing a respective one or more of the plurality of executed transactions, the replica being configured to:

receive, at a first time, from a client a first request for a receipt of a first transaction of said executed transactions;

receive, at a second time later than the first time, a second request for a receipt of a second transaction of said executed transactions, the first and second transactions being represented by different leaves of the hash tree;

determine, by the replica, that the second time is within a configurable period of time after the first time;

in response to the determining that the second time is within the configurable period of time:

determine, by the replica, compressed path information comprising a minimum set of values required to generate the hash root from either the first transaction or the second transaction given the first transaction and the second transaction; and generate, by the replica, a combined receipt for the first and second transactions, the combined receipt comprising:

the determined compressed path information; and signatures of one or more of the replicas which signed the hash root; and provide the combined receipt to the client.

7. The non-transitory machine-readable medium of claim 5, wherein the operations further comprise:

requesting a first receipt for the first transaction;

requesting a second receipt for the second transaction;

receiving the first receipt comprising first path information comprising a set of values required to generate the hash root from the first transaction; and receiving the second receipt comprising second path information comprising a set of values required to generate the hash root from the second transaction.

8. The method of claim 1, wherein the determining of the compressed path information comprises:

determining, by a computing device:

a first path in the hash tree from a first leaf node corresponding to the first transaction toward the hash root, and a second path in the hash tree from a second leaf node corresponding to the second transaction toward the hash root, wherein the first path and the second path include respective parent-child sequence of hash nodes;

identifying, for nodes along respective paths, sibling nodes, wherein each of the nodes has a hash value that, when combined through a hash function with a hash value of respective sibling nodes, yields a hash value of a corresponding parent node at a higher level of the tree;

identifying, from the nodes and respective sibling nodes, hash values sufficient to reconstruct the hash root independently from the first leaf node and from the second leaf node; and omitting redundant hash values, including redundant node hash values and redundant sibling hash values, so that the compressed path information includes only the minimum set of hash values sufficient to reconstruct the hash root from either the first or the second transaction.

9. The method of claim 1, wherein the generating of the combined receipt is performed without first generating individual receipts.

10. The method of claim 1, wherein the combined receipt includes a pointer to a last governance transaction, wherein the receipt proves that it includes correct and up-to-date collection of governance transaction receipts.

11. The method of claim 1, wherein the combined receipt further includes compressed path information associated with a third transaction.

12. The method of claim 1, wherein the determining of the compressed path information comprises:

determining, by a computing device:

a first path in the hash tree from a first leaf node corresponding to the first transaction toward the hash root, and a second path in the hash tree from a second leaf node corresponding to the second transaction toward the hash root, wherein the first path and the second path include respective parent-child sequence of hash nodes;

identifying, for nodes along respective paths, sibling nodes, wherein each of the nodes has a hash value that, when combined through a hash function with a hash value of respective sibling nodes, yields a hash value of a corresponding parent node at a higher level of the tree;

identifying, from the nodes and respective sibling nodes, hash values sufficient to reconstruct the hash root independently from the first leaf node and from the second leaf node; and omitting redundant hash values, including redundant node hash values and redundant sibling hash values, so that the compressed path information includes only the minimum set of hash values sufficient to reconstruct the hash root from either the first or the second transaction.

13. The non-transitory machine-readable medium of claim 5, wherein the operations further comprise obtaining, by the replica, a first receipt for the first transaction and a second receipt for the second transaction; and wherein said determining of the compressed path information is performed based on the first receipt and second receipt.

14. The non-transitory machine-readable medium of claim 5, wherein:

the replica generates a first receipt in response to the first request and a second receipt in response to the second request; and the generating comprises combining the first receipt and the second receipt based on information present in the first receipt and the second receipt.

15. The non-transitory machine-readable medium of claim 5, wherein the combined receipt includes a pointer to a last governance transaction, wherein the receipt proves that it includes correct and up-to-date collection of governance transaction receipts.

16. The non-transitory machine-readable medium of claim 5, wherein the combined receipt further includes compressed path information associated with a third transaction.

17. The replica of claim 7, wherein the generating of the combined receipt is performed without first generating individual receipts.

18. The replica of claim 7, wherein the combined receipt further includes compressed path information associated with a third transaction.

19. The replica of claim 7, wherein the determining of the compressed path information comprises:

determining, by a computing device:

a first path in the hash tree from a first leaf node corresponding to the first transaction toward the hash root, and a second path in the hash tree from a second leaf node corresponding to the second transaction toward the hash root, wherein the first path and the second path include respective parent-child sequence of hash nodes;

identifying, for nodes along respective paths, sibling nodes, wherein each of the nodes has a hash value that, when combined through a hash function with a hash value of respective sibling nodes, yields a hash value of a corresponding parent node at a higher level of the tree;

identifying, from the nodes and respective sibling nodes, hash values sufficient to reconstruct the hash root independently from the first leaf node and from the second leaf node; and omitting redundant hash values, including redundant node hash values and redundant sibling hash values, so that the compressed path information includes only the minimum set of hash values sufficient to reconstruct the hash root from either the first or the second transaction.

20. The replica of claim 7, wherein:

the replica generates a first receipt in response to the first request and a second receipt in response to the second request; and the generating comprises combining the first receipt and the second receipt based on information present in the first receipt and the second receipt.

* * * * *